H. YUNG.
POULTRY FOUNTAIN.
APPLICATION FILED OCT. 3, 1910.

1,006,618.

Patented Oct. 24, 1911.

WITNESSES:
J. Miller
M. R. Wilson

INVENTOR
Henry Yung,
BY
ATTORNEYS.

UNITED STATES PATENT OFFICE.

HENRY YUNG, OF SHILOH, SOUTH DAKOTA.

POULTRY-FOUNTAIN.

1,006,618.     Specification of Letters Patent.     Patented Oct. 24, 1911.

Application filed October 3, 1910. Serial No. 585,109.

*To all whom it may concern:*

Be it known that I, HENRY YUNG, a citizen of the United States, residing at Shiloh, in the county of Sully and State of South Dakota, have invented certain new and useful Improvements in Poultry-Fountains, of which the following is a specification.

My invention relates to drinking fountains, but more particularly to a device of this kind designed to use in poultry yards, my object being the production of a device of the above character, which will be extremely simple to assemble and take apart, and inexpensive of construction, strong and durable, and by means of which a considerable quantity of water may be maintained at a temperature above freezing during the cold weather, at a small cost.

Figure 1:
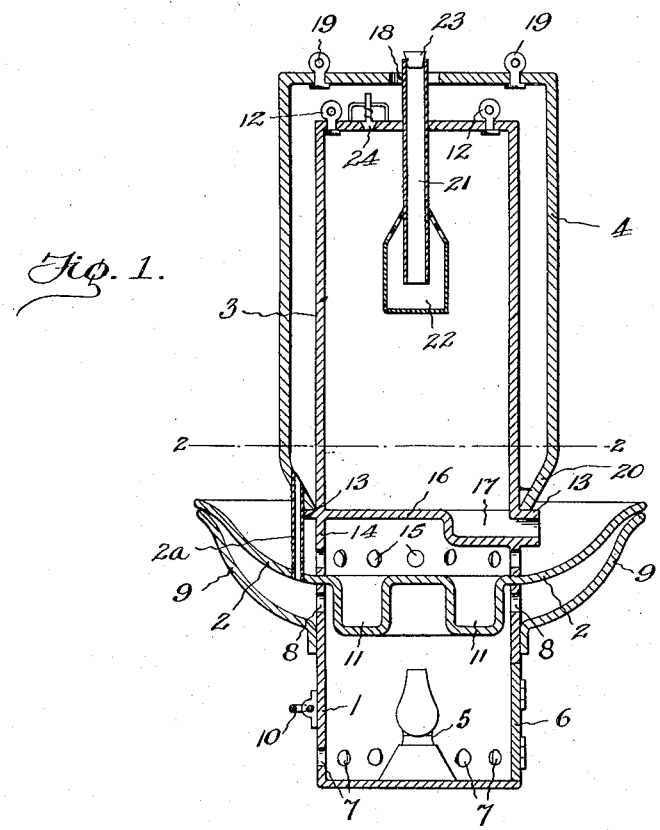
Figure 2:
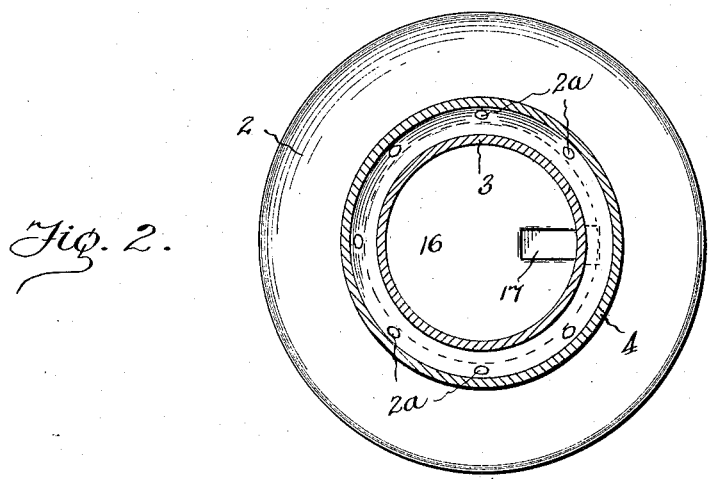

In the accompanying drawing, Figure 1, is a central vertical section, and Fig. 2, is a horizontal section on the line 2—2 of Fig. 1.

Referring to these figures, my improved device comprises a base or stand 1, a water bowl or trough 2, a water tank 3, and a casing 4, all these parts being detachable from one another, and constructed of sheet metal in cylindrical form, as will be seen from Fig. 2.

The base or stand 1, supports, upon its closed bottom, a suitable lamp or other heater 5, to which access may be had through a door 6, and draft for which is supplied through a lower circular series of openings 7. This base 1, is also provided with a circular series of openings 8, adjacent its upper open end, and has secured thereto, at a point below the openings 8, an outstanding circular and upwardly curved flange 9. The base 1, may also have one or more handles 10, to be grasped when it is desired to transport the device from place to place.

The bowl or trough 2, which is substantially concavo-convex in form, is adapted to rest upon the upper edge of the base 1, with its outer edge in contact with the outer edge of the base flange 9, and may have a circular channel indicated at 11, therein to extend down into said base directly above the heater 5. This bowl 2 has also a plurality of vertical pipes 2ª in a circular series, the lower ends of which communicate with the space between the bowl and the flange 9.

The tank 3, which has a top provided with handles 12, is provided with a circular outstanding rib 13, and with a rim 14 below said rib, having a circular series of apertures 15, the lower edge of said rim 14 being adapted as shown, to rest upon the bowl 2, around its depressions 11. The base 16 of this tank, which is flush with the rib 13, is formed at one portion thereof into a spout 17, which outlets into the bowl 2, at a point below the plane of the upper edge of the latter, so that the bowl will always be filled to the plane of said spout by the contents of the tank.

The casing 4, the upper end of which is closed, except for a central opening 18, and is provided with handles 19, is of greater diameter than the tank 3, so as to fit over the same and provide a channel, and has a contracted lower edge 20, which may rest, as shown, upon the tank rib 13 closely against said tank, said contracted edge having a series of openings to receive the upper ends of the pipes 2ª, of the bowl 2. Thus, with the tank 3 filled, and its cover 4 seated thereon, the bowl 2 will be automatically filled to the level of the spout 17, and with the heater 5 lighted, heated air will rise through the upper openings 8 of the base 1, into the space between the flange 9, and the bowl 2, and from there, upwardly through pipes 2ª, and into the space between the tank 3, and casing 4, from where it may escape into the atmosphere through the casing opening 18.

The tank 3 may be filled, without removing the casing 4, by means of a pipe 21, which is secured through the cover 12, the upper end of which extends exteriorly through the casing opening 18, when casing 4 is in position, and the lower end of which projects within and is secured to, a small cylindrical vessel 22, the lower end of this vessel being closed, and the upper end thereof being perforated, as shown. The upper outer end of this pipe 21 is normally closed by a stopper 23, which is adapted to be placed within the end of the spout 17, when the tank 3 is being filled. The tank 3 also has a relief valve 24 to permit escape of air when tank 3 is being filled. From this it will also be seen that the tank 3 may be readily separated from the remaining parts and placed in any ordinary bowl, for summer use when it is not essential to have the water heated.

Having thus fully described my invention, what I claim is:

1. The combination of a hollow stand, a bowl supported thereon, a flange encircling the stand, and extending at its outer edge in contact with the bowl, the wall of the stand having apertures which open into the space between the bowl and the flange, a tank seating in the bowl and having an outlet thereinto, a casing encircling the tank and having an outlet, flues extending into the casing from the aforesaid space between the bowl and the flange, and a heater in the stand.

2. The combination of a hollow stand, a bowl supported thereon, a flange encircling the stand, and extending at its outer edge in contact with the bowl, the wall of the stand having apertures which open into the space between the bowl and the flange, a tank seating in the bowl and having an outlet thereinto, a casing encircling the tank and having an outlet, flues extending into the casing from the aforesaid space between the bowl and the flange, said flues passing through the bowl, and the heater in the stand.

3. The combination of a hollow stand, a bowl supported thereon, a flange encircling the stand, and extending at its outer edge in contact with the bowl, the wall of the stand having apertures which open into the space between the bowl and the flange, a tank having an apertured rim depending from its bottom and seating in the bowl, and said tank being provided with an outlet into the bowl, a casing encircling the tank and having an outlet, flues extending into the casing from the aforesaid space between the bowl and the flange, and a heater in the stand.

In testimony whereof I affix my signature in presence of two witnesses.

HENRY YUNG.

Witnesses:
EMIL MAJOURS,
R. L. MAREILTE.